United States Patent
Ayer et al.

[15] 3,689,511
[45] Sept. 5, 1972

[54] PROCESS FOR PRODUCTION OF ERGOSTA-4,22-DIEN-3-ONE FROM ERGOSTEROL

[72] Inventors: Donald E. Ayer, Kalamazoo, Mich. 49001; David R. White, Kalamazoo, Mich. 49007

[73] Assignee: The Upjohn Company, Kalamazoo, Mich.

[22] Filed: June 17, 1971

[21] Appl. No.: 154,227

[52] U.S. Cl.................................260/397.2
[51] Int. Cl...................C07c 167/00, C07c 167/34
[58] Field of Search...................260/397.2

Primary Examiner—Henry A. French
Attorney—John Kekich et al.

[57] ABSTRACT

A process for the production of ergosta-4,22-dien-3-one from ergosterol. The intermediate 4,22-ergostadiene-3-one is readily converted by known methods to progesterone which is a valuable progestational agent and intermediate from which other highly active steroids are derived.

6 Claims, No Drawings

PROCESS FOR PRODUCTION OF ERGOSTA-4,22-DIEN-3-ONE FROM ERGOSTEROL

BACKGROUND OF THE INVENTION

The process of this invention provides a new and economical method for obtaining progesterone from ergosterol. Ergosterol is a natural substance available in almost unlimited potential supply from fermentation.

SUMMARY OF THE INVENTION

The process of this invention comprises subjecting ergosterol (I) to an Oppenauer oxidation; reacting the ergosta-4,7,22-trien-3-one (II) so obtained, with a secondary amine to obtain a 3-enamine (III); protonating the 3-aminoergosta-3,5,7,22-tetraene (III) so obtained with a mineral acid to give the corresponding protonated 3-enamine (IV); isomerizing the protonated 3-enamine so obtained to give the corresponding protonated 4,6,22-triene (V); reacting compound (V) so obtained with a β-unsaturated primary amine to obtain the corresponding ergosta-4,6,22-triene-3-imine (Schiff's base); subjecting the 3-imine (VI) so obtained to rearrangement in the presence of a strong base to obtain the corresponding β-unsaturated N-(substituted methylene) amine (VII) and hydrolyzing the 3-amine so obtained under aqueous conditions to give ergosta-4,22-trien-3-one (VIII). The ergosta-4,22-trien-3-one is then converted by methods known in the art to progesterone.

Alternatively, the ergosta-4,6,22-trien-3-imines (VI) are prepared from ergosta-4,7,22-trien-3-one (II) by reaction with a β-unsaturated primary amine to obtain the corresponding ergosta-2,5,7,22-tetraen-3-amine (IX); protonating the 3-amine so obtained with a mineral acid to give the corresponding salt (X) and isomerizing the amine salt so obtained, under acidic conditions to obtain the corresponding ergosta-4,6,22-trien-3-imine (VI).

DETAILED DESCRIPTION OF THE INVENTION

The process of this invention is illustratively represented by the following sequence of formulae:

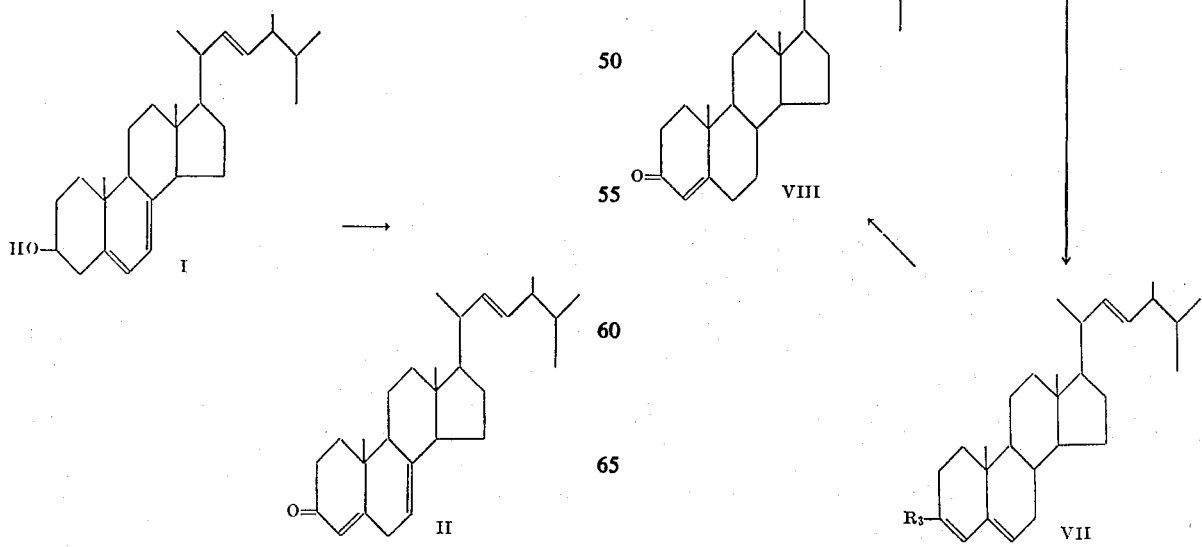

wherein R and R₁ taken separately are each selected from the group consisting of alkyl and cycloalkyl and R and R₁ taken together with

constitute a saturated heterocyclic amino radical; $R_2$ is a β-unsaturated imino radical; $R_3$ is a β-unsaturated N-(substituted methylene)-amino radical; and X is the anion of the protonating strong acid hereinafter defined.

In this application the term "alkyl" means an alkyl radical of one to eight carbon atoms, inclusive, such as methyl, ethyl, propyl, butyl, amyl, hexyl, heptyl, octyl, and isomeric forms thereof. The term "cycloalkyl" means a cycloalkyl radical of three to eight carbon atoms, inclusive, such as cyclopropyl, cyclobutyl, cyclopentyl, cyclohexyl, cycloheptyl, and cyclooctyl. The term "cyclic amino radical" means a saturated five to nine ring atom cyclic amino radical such as pyrrolidino, alkylpyrrolidino, such as 2-methylpyrrolidino, 2,2-dimethylpyrrolidino, and the like, piperidino, alkylpiperidino such as 2-methylpiperidino, 3-methylpiperidino, 4,4-dimethylpiperidino and the like, 4-methylpiperazino and the like, morpholino, alkylmorpholino, such as 2-methylmorpholino, 3-methylmorpholino and the like, hexamethyleneimino, homomorpholino, homopiperidino, thiomorpholino, octamethyleneimino, and the like. The term "β-unsaturated imino radical" means a radical having the basic structure,

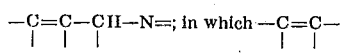

is an isolated double bond or part of an aromatic carbocyclic or heterocyclic ring system. The term β-unsaturated N-(substituted methylene)-amino radical means a radical having the basic structure,

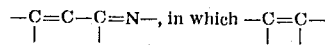

is an isolated double bond or part of an aromatic carbocyclic or heterocyclic ring system.

In carrying out the process of this invention, ergosterol (I) is subjected to an Oppenauer oxidation with cyclohexanone and aluminum isopropoxide under reflux in a suitable solvent such as toluene in accordance with methods known in the art, for example, J. Am. Chem. Soc. 77, 1212–1215 (1955), to obtain ergosta-4,7,22-trien-3-one (II). Compound II thus obtained, is then converted to the corresponding 3-enamine (III) in accordance with known methods, for example, by reacting ergosta-4,7,22-trien-3-one with the selected secondary amine in accordance with methods known in the art, for example U.S. Pat. Nos. 2,781,342, 2,886,564 and 3,444,160. In the practice of this invention the secondary cyclic amines are preferred. The 3-enamine thus obtained is then isolated from the reaction mixture in accordance with methods known in the art, for example, by crystallization from a suitable organic solvent such as ethyl acetate. Isolation of the 3-enamines (III) from the reaction mixture provides an effective and desirable method of isolating the compound having the desired structure (II) from the reaction mixture.

The 3-enamine (III) thus obtained is then converted to the corresponding protonated 3-enamine (IV) (an acid addition salt thereof) by reaction with an acid in the usual manner for the production of amine acid addition salts as disclosed in U.S. Pat. Nos. 2,920,085 and 3,444,160. Acids which are used for protonation of the 3-enamines are strong acids, for example, mineral acids, such as hydrochloric, sulfuric, perchloric, hydrobromic, hydrofluoric, fluoroboric, nitric and phosphoric acids or strong organic acids such as alkyl and aryl sulfonic acids, e.g., methanesulfonic ethanesulfonic, benzene sulfonic and p-toluene sulfonic and the like. The protonation is carried out by dissolving the 3-enamine in a suitable solvent and treating it with the selected acid. Solvents which can be used are, for example, alcohols, halogenated hydrocarbons, esters, ethers, hydrocarbons, sulfones, substituted amides, mixtures thereof and the like. For the purpose of the present process the protonation is preferably carried out under anhydrous conditions in an inert, e.g., nitrogen atmosphere. Water is removed from the 3-enamine solution prior to protonation by any convenient manner, for example, azeotropically or by distillation, adsorption, absorption, hydration (e.g., calcium sulfate) or by chemical reaction (e.g., titanic chloride). The protonated 3-enamine (IV) thus obtained, is then isomerized to the corresponding 4,6,22-triene (V) by heating the reaction mixture to elevated temperatures until the isomerization is complete. The isomerization is conveniently accomplished by heating the reaction mixture at reflux for a period of about 1 to 24 hours depending on the boiling point of the solvent or solvents employed. A temperature range of about 50° to 125° C. is preferred for the isomerization.

Compound V thus obtained is then, preferably without isolation, reacted with an excess of a β-unsaturated primary amine having the partial structure:

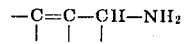

in which

is an isolated double bond or part of an aromatic carbocyclic or heterocyclic ring system, such as benzylamine, 4-methylbenzylamine, 3-ethylbenzylamine, 2-aminomethylpyridine, 3-aminomethylpyridine, 4-aminomethylpyridine, 2-aminomethylpyridine-N-oxide, alkylamine, and the like; benzylamine and substituted benzylamines are preferred to obtain the corresponding ergosta-4,6,22-trien-3-imine (VI). In carrying out the reaction compound V is treated with the selected β-unsaturated primary amine and heated to slowly distill off the secondary amine as it is released during the formation of the 3-imine (VI). Removal of the released secondary amine impels the formation of the desired 3-imine (VI). The 3-imine thus obtained, is isolated and purified by conventional methods, for example the reaction mixture is filtered to remove the amine salts present and the filtrate is concentrated and recrystallized from a suitable organic solvent, such as pentane, hexane, benzene, toluene, methylene chloride, alkanols and the like.

The 3-imine (VI), thus obtained, is dissolved in a suitable organic solvent such as, diethylene glycol, diethyl ether, benzene, toluene, methylene chloride, alknaols (e.g., methanol, ethanol, propanol, butanol, tert.-butanol and the like), and subjected to a base (strong base) catalyzed rearrangement to obtain the corresponding β-unsaturated (N-substituted methylene) ergosta-3,5,22-trien-3-amine (VII). Strong bases which can be used for example those of the formula: M⁺ (B⁻) in which M is a group I or II metal and B⁻ the conjugate base of a weak acid such as an alcohol, amine, alkane, sulfoxide or an aromatic system, for example, sodium methoxide, potassium tert.-butoxide, magnesium ethoxide, sodium methylsulfonyl methide, lithium diethylamide, n-butyl lithium, sodium tert.-amylate, naphthalene sodium, sodium amide, and the like. Sodium, potassium or lithium hydride in the presence of a weak acid also can be used. The rearrangement reaction is advantageously carried out under an inert, e.g., nitrogen, atmosphere, preferably in the absence of oxygen, at a temperature within the range of from about 50° to about 125° C., about 80° to 100° C. is preferred. The time required for the rearrangement varies with the temperature employed, a period of from several minutes to about 3 hours is generally sufficient. When the rearrangement is complete the 3-amine (VII), thus obtained is hydrolyzed under aqueous conditions, preferably without isolation from the reaction mixture, to obtain ergosta-7,22-dien-3-one (VIII). The hydrolysis can be carried out simply by diluting the reaction mixture with water or preferably with water in the presence of a weakly acid salt such as ammonium chloride or with water under mildly acidic conditions. Acids which can be used include for example mineral acids such as hydrochloric, sulfuric, phosphoric and the like or organic acids such as formic, acetic, propionic, butyric, methanesulfonic, benzenesulfonic and the like. The hydrolysis can be carried out under a wide temperature range depending on the conditions employed and the particular amine group present at the 3-position, a temperature within the range of 50° to 100° C. is generally satisfactory. The time required for the reaction is not critical and can be varied between about 30 minutes to several hours, depending on the temperature employed. The ergosta-4,22-dien-3-one (VIII) thus obtained, can be recovered from the reaction mixture and purified by conventional methods, for example by extraction with a suitable water immiscible organic solvent such as ethyl acetate, methylene chloride, benzene, toluene, ether, chloroform, carbon tetrachloride, amyl acetate, trichloroethylene, xylene, hexanes and the like followed by crystallization from a suitable solvent such as methanol, ethanol, acetone, hexanes, ethyl acetate, mixtures thereof and the like, if further purification is desired.

Alternatively, the ergosta-4,6,22-trien-3-imines of formula (VI) are prepared from ergosta-4,7,22-trien-3-one (II) in accordance with the following reaction sequence:

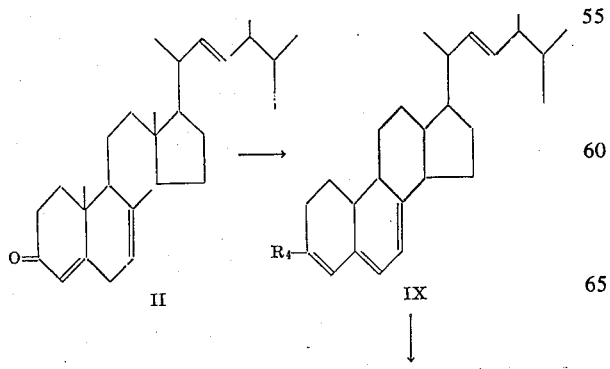

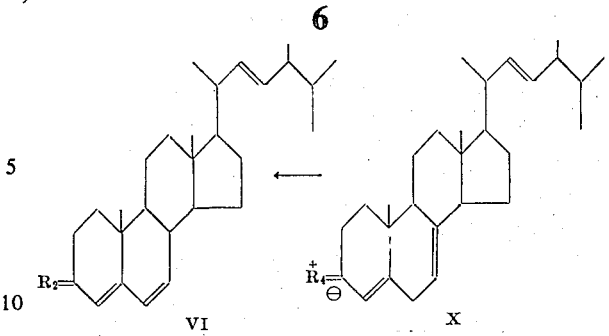

wherein $R_4$ is a β-unsaturated amino radical having the basic structure:

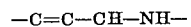

in which

is an isolated double bond or part of an aromatic carbocyclic or heterocyclic ring system, and $R_2$ has the meaning previously given.

In carrying out the reaction compound II is reacted with a β-unsaturated primary amine in the same manner as hereinbefore described for the preparation of the 3-enamines of formula III, to obtain the corresponding 3-enamine (IX). Compound (IX) thus obtained, is then protonated with a strong acid to obtain the corresponding compound of formula X, in the same manner as described above for the protonation of the compounds of formula III. The compounds of formula X are then subjected to isomerization to obtain the corresponding compounds of formula VI, in the same manner as disclosed hereinabove for the isomerization of the compounds of formula IV to obtain the compounds of formula V. The compounds of formula VI obtained by the alternative route can likewise be converted to ergosta-4,22-dien-3-one VIII as disclosed hereinabove.

Ergosta-4,22-dien-3-one (VIII) obtained by either route is converted to progesterone, an active progestational agent, in the manner disclosed by Shepherd et al., J. Am. Chem. Soc. 77, 1212–1215 (1955).

The following examples are for the purpose of illustrating the best mode contemplated by the inventors for carrying out the invention and to supplement the foregoing disclosure of the invention with additional descriptions of the manner and process of carrying out the invention, but are not to be contrued as limiting.

NMR spectra are recorded on a Varian A–60 spectrophotometer with tetramethylsilane as an internal standard (downfield) and using solvents as indicated below.

EXAMPLE 1

3-(1-pyrrolidinyl)ergosta-3,5,7,22-tetraene (III)

A mixture of 50 g. of ergosterol hydrate (I) and 450 ml. of toluene is stirred under reflux with a water separator for about 1.5 hours, 118 g. of cyclohexanone is then added and refluxing is continued for an additional period of about 1 hour. The solution is then cooled to about 105° C., 6.5 g. of aluminum isopropoxide is added and refluxing is resumed and continued for about 45 minutes. The reaction mixture is cooled to about 90° C. and then 17 g. of acetic acid and 8 ml. of water are added. The mixture is stirred and cooled to about 15° C., filtered and the solids washed with 100 ml. of toluene. The filtrate and toluene wash are combined, 700 ml. of water is added and the mixture is steam distilled to remove most of the toluene (about 3 hours). The water is then removed by distillation under vacuum and the residue containing ergosta-4,7,22-trien-3-one is redissolved in 200 ml. of toluene, washed with brine and the brine is backwashed with 100 ml. of toluene. The toluene solution and wash are combined and transferred to a still by rinsing with an additional 75 ml. of toluene. The toluene solution is then dried by distillation, placed under a nitrogen atmosphere and treated with 15 ml. of pyrrolidine. The mixture is then heated under reflux with a water separator until no additional water is removed (about 2 to 4 hours); 180 ml. of hot ethyl acetate is then added and the mixture is cooled to about 5° C. The crystallized product thus obtained is collected on a filter, washed with ethyl acetate and dried to give 40.6 g. of 3-(1-pyrrolidinyl)ergosta-3,5,7,22-tetraene (III), m.p. 189–200° C. (dec) $\lambda_{max.}^{ether}$ 360 nm.; NMR peaks (CDCl$_3$) at 193, 293, and 310–338 c/s.

EXAMPLE 2

1-ergosta-4,6,22-trien-3ylidinepyrrolidinium chloride (V)

To a suspension of 4.48 g. of 3-(1-pyrrolidinyl)-ergosta-3,5,7,22-tetraene (III) in 40 ml. of toluene-ethanol (4:1) is added 3 ml. of 3.6N hydrogen chloride in ether to give 1-ergosta-4,7,22-trien-3-ylidinepyrrolidinium chloride (IV), λmax. 274 nm. The solution is then heated under reflux until shift in the U. V. absorption to 328 nm. is complete (about 3 hours). The solvent is then evaporated from the solution and the residue thus obtained is crystallized from methanol-acetone-hexanes to give 3.7 g. of 1-ergosta-4,6,22-trien-3ylidinepyrrolidinium chloride (V), m.p. 230°–236° C.; $\lambda_{max.}^{CH_3OH}$ 326 nm. ( ε 34,650); NMR peaks (CDCl$_3$) at 248, 314 and 386 c/s.

EXAMPLE 3

N-benzylergosta-4,6,22-trien-3-imine (VI)

To a mixture of 17.90 g. of 3-(1-pyrrolidinyl)ergosta-3,5,7,22-tetraene (III) in 160 ml. of dry toluene and 40 ml. of absolute alcohol is added 7.90 ml. of a 2.41N solution of hydrogen chloride in ether with stirring to give 1-ergosta-4,7,22-trien-3-ylidinepyrrolidinium chloride (IV). The mixture is then placed under a nitrogen atmosphere and refluxed slowly for about 17 hours to give the 1-ergosta-4,6,22-trien-3-ylidinepyrrolidinium chloride (V). The reaction mixture is allowed to cool and then a solution of 13.1 ml. of benzyl amine in 20 ml. of absolute ethanol and 20 ml. of toluene is added over a period of about 45 minutes. The temperature is then increased slowly to bring about a very slow distillation of ethanol, pyrrolidine and finally some toluene. After about 130 ml. of distillate has been removed the residue is cooled in an ice bath while maintaining the residue under a nitrogen atmosphere. The crystalline precipitate thus obtained (4.89 g.) is filtered off (under nitrogen), the filtrate is concentrated under reduced pressure at about 60° C. and then diluted with degassed pentane and cooled. The crystalline product thus obtained is collected on a filter and dried to give 12.14 g. of N-benzyl-ergosta-4,6,22-trien-3-amine (VI), $\lambda_{max.}^{CH_3CN}$ 275 nm. (ε 36,381); infrared (CHCl$_3$) absorption at 1602, 1580, 1495, 1450, 1380, 970, 885, and 700 cm$^{-1}$; NMR peaks (CDCl$_3$) at 276, 314, 361, and 439 c/s.

EXAMPLE 4

Ergosta-4,22-dien-3-one (VIII)

Dry tetrahydrofuran (15 ml.) is heated to reflux for about 10 minutes under nitrogen and then cooled to room temperature; 483 mg. of N-benzylergosta-4,6,22-trien-3-imine (VI) is added, the mixture is stirred until the 3-imine is dissolved, and the 112 mg. of potassium tert.-butoxide is added. The reaction mixture is then stirred at about 60° C. for about 1 hour, and then more base (18 mg.) is added, while keeping the mixture under a nitrogen atmosphere, to give N-benzylidineergosta-3,5,22-trien-3-amine (VII). After about another 15 hours the reaction mixture is poured into an aqueous ammonium chloride solution and heated on a steam bath for about 2 hours. The mixture is then cooled to about room temperature, extracted with ethyl acetate and the ethyl acetate removed to give ergosta-4,22-dien-3-one (VIII) ( 68 percent yield by GLC); an analytical sample prepared by chromatography shows the following assay: $\lambda_{max.}^{CH_3OH}$ 242 nm. (ε 16,600); infrared ($\lambda_{max.}^{CHCl_3}$)) absorption at 1670, 1620, 1451, 1374, 1271, 1230, 1185, 964, 865, and 695 cm$^{-1}$; NMR peaks (CDCl$_3$) at 312 and 344 c/s.

We claim:
1. The process for the production of 4,22-ergostadien-3-one which comprises
   1. subjecting ergosterol to an Oppenauer oxidation to obtain ergosta-4,7,22-trien-3-one;
   2. reacting the ergosta-4,7,22-trien-3-one so obtained with a secondary amine to obtain a 3-enamine of the formula:

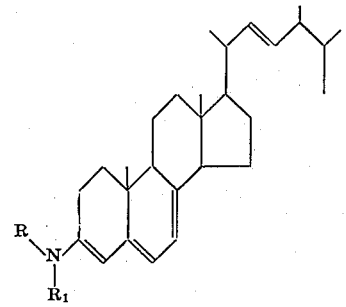

wherein R and R$_1$ taken separately are each selected from the group consisting of alkyl and cycloalkyl and R and R$_2$ taken together with

constitute a saturated heterocyclic amino radical;
   3. treating the 3-enamine so obtained with a strong acid to obtain the corresponding protonated 3-enamine of the formula:

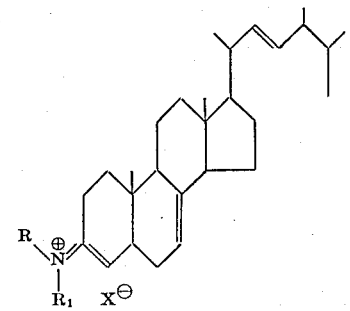

wherein R and R$_1$ have the meanings given above; and X is the anion of a strong acid;

4. isomerizing the protonated 3-enamine so obtained to give the corresponding 4,6,22-triene of the formula:

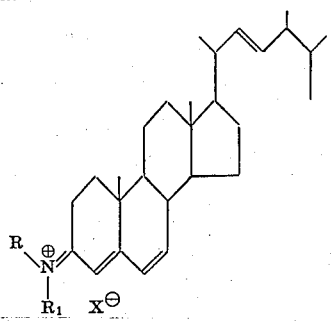

wherein R, R₁ and X have the meanings given above;

5. reacting the 4,6,22-trien so obtained with a β-unsaturated primary amine to obtain a 3-imine of the formula:

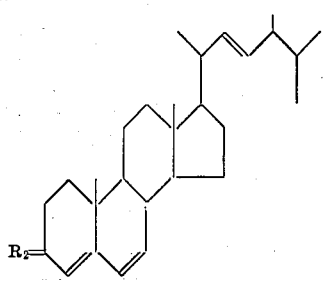

wherein R₂ is a β-unsaturated imino radical;

6. subjecting the 3-imine so obtained to a strong base catalyzed rearrangement to give a 3-amine of the formula:

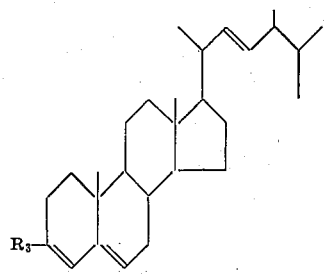

wherein R₃ is a β-unsaturated (N-substituted methylene)-amino radical, and;

7. hydrolyzing the 3-amine so obtained in the presence of water to produce ergosta-4,22-dien-3-one.

2. The process for the production of ergosta-4,22-dien-3-one which comprises:

1. subjecting ergosterol to an Oppenauer oxidation to obtain ergosta-4,7(22)-trien-3-one;
2. reacting the ergosta-4,7,22-trien-3-one so obtained with pyrrolidine to obtain 3-(1-pyrrolidinyl)-ergosta-3,5,7,22-tetraene;
3. protonating the 3-(1-pyrrolidinyl)-ergosta-3,5,7,22-tetraene so obtained with hydrogen chloride to obtain 1-ergosta-4,7,22-trien-3-ylidinepyrrolidinium chloride;
4. isomerizing the 4,7,22-triene so obtained to give 1-ergosta-4,6,22-trien-3-ylidinepyrrolidinium chloride;
5. reacting the 4,6,22-triene so obtained with benzyl amine to give N-benzylergosta-4,6,22-trien-3-imine;
6. subjecting the 3-imine so obtained to rearrangement in the presence of a strong base to give N-benzyl-lidineergosta-3,5,22-trien-3-amine and;
7. hydrolyzing the 3-amine so obtained in the presence of water to produce ergosta-4,22-dien-3-one.

3. The process for the production of 4,22-ergostadien-3-one which comprises 1. treating a 3-enamine of the formula:

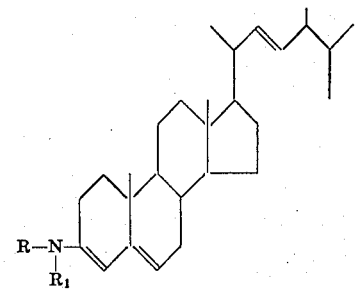

wherein R and R₁ taken separately are each selected from the group consisting of alkyl and cycloalkyl and R and R₂ taken together with

constitute a saturated heterocyclic amino radical, with a strong acid to obtain the corresponding protonated 3-enamine of the formula:

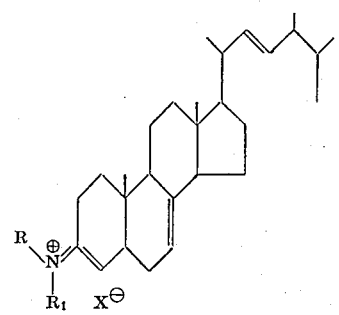

wherein R and R₁ have the meanings given above, and X is the anion of a strong acid;

2. isomerizing the protonated 3-enamine so obtained to give the corresponding 4,6,22-triene of the formula:

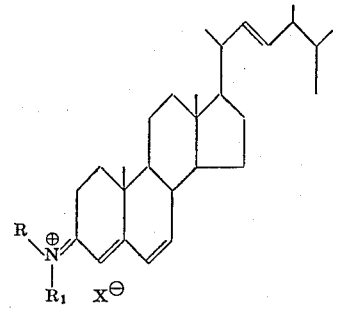

wherein R, R₁ and X have the meanings given above;

3. reacting the 4,6,22-trien so obtained with a β-unsaturated primary amine to obtain a 3-imine of the formula:

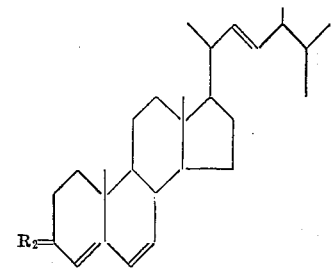

wherein $R_2$ is a β-unsaturated imino radical;
4. subjecting the 3-imine so obtained to a strong base catalyzed rearrangement to give a 3-amine of the formula:

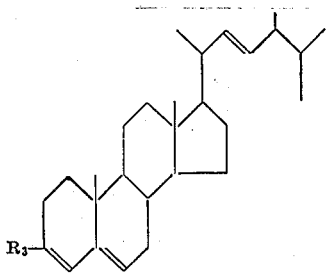

wherein $R_3$ is a β-unsaturated (N-substituted methylene)-amino radical, and;
5. hydrolyzing the 3-amine so obtained in the presence of water to product ergosta-4,22-dien-3-one.

4. The process for the production of ergosta-4,22-dien-3-one which comprises:
 1. protonating 3-(1-pyrrolidinyl)-ergosta-3,5,7,22-tetraene with hydrogen chloride to obtain 1-ergosta-4,7,22-trien-3-ylidinepyrrolidinium chloride;
 2. isomerizing the 4,7,22-triene so obtained to give 1-ergosta-4,6,22-trien-3-ylidinepyrrolidinium chloride;
 3. reacting the 4,6,22-triene so obtained with benzyl amine to give N-benzylergosta-4,6,22-trien-3-imine;
 4. subjecting the 3-imine so obtained to rearrangement in the presence of a strong base to give N-benzyl-idineergosta-3,5,22-trien-3-amine and;
 5. hydrolyzing the 3-amine so obtained in the presence of water to produce ergosta-4,22-dien-3-one.

5. The process for the production of ergosta-4,22-dien-3-one which comprises
 1. subjecting a 3-imine of the formula:

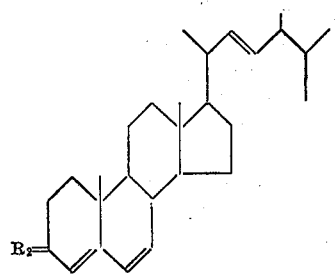

wherein $R_2$ is a β-unsaturated imino radical, to rearrangement in the presence of a strong base to give the corresponding 3-amine of the formula:

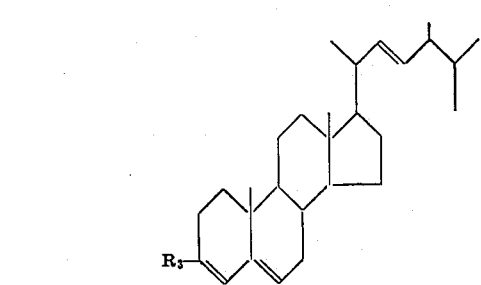

wherein $R_3$ is a β-unsaturated (N-substituted methylene)-amino radical, and
 2. hydrolyzing the 3-amine so obtained in the presence of water to produce ergosta-4,22-dien-3-one.

6. The process for the production of ergosta-4,22-dien-3-one which comprises:
 1. subjecting N-benzylergosta-4,6,22-trien-3-imine to rearrangement in the presence of a strong base to obtain N-benzylidineergosta-3,5,22-trien-3-amine, and;
 2. hydrolyzing the 3-amine so obtained in the presence of water to produce ergosta-4,22-dien-3-one.

* * * * *

UNITED STATES PATENT OFFICE
CERTIFICATE OF CORRECTION

Patent No. 3,689,511  Dated September 5, 1972

Inventor(s) Donald E. Ayer and David R. White

It is certified that error appears in the above-identified patent and that said Letters Patent are hereby corrected as shown below:

Column 2, lines 10-11, should appear as shown below instead of as in the patent

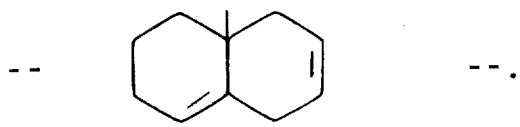

Column 8, lines 65-66, claim 1, should appear as shown below instead of as in the patent:

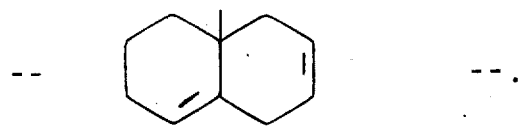

Column 10, lines 21-23, claim 3, should appear as shown below instead of as in the patent:

Signed and sealed this 24th day of April 1973.

(SEAL)
Attest:

EDWARD M. FLETCHER, JR.
Attesting Officer

ROBERT GOTTSCHALK
Commissioner of Patents